United States Patent [19]
Billaud et al.

[11] Patent Number: 5,406,288
[45] Date of Patent: Apr. 11, 1995

[54] METHOD AND DEVICE TO IMPROVE THE PROBABILITY OF VALIDITY OF THE CODES OF SECONDARY RADAR RESPONSES

[75] Inventors: Philippe Billaud, Fontenay Aux Roses; Claude de Volder, Auffargis; Michel Wybierala, Versailles, all of France

[73] Assignee: Thomson-CSF, Puteaux, France

[21] Appl. No.: 85,210

[22] Filed: Jun. 29, 1993

[30] Foreign Application Priority Data

Jun. 30, 1992 [FR] France ................. 92 08027

[51] Int. Cl.⁶ ............................................. G01S 13/74
[52] U.S. Cl. .................................... 342/37; 342/40
[58] Field of Search ........................ 342/37, 32, 40

[56] References Cited

U.S. PATENT DOCUMENTS

| | | |
|---|---|---|
| 4,796,030 | 1/1989 | Colotti et al. . |
| 5,089,822 | 2/1992 | Abaunza et al. ............ 342/30 |
| 5,196,855 | 3/1993 | Kuroda ..................... 342/37 |

FOREIGN PATENT DOCUMENTS

| | | |
|---|---|---|
| 0426543 | 5/1991 | European Pat. Off. . |
| 2021895 | 12/1979 | United Kingdom . |

OTHER PUBLICATIONS

Trim, R. M., "Mode S: an introduction and overview", Electronics & Communication Engineering Journal, vol. 2, No. 2, Apr. 1990, London, GB, pp. 53–59.

Primary Examiner—Mark Hellner
Attorney, Agent, or Firm—Meltzer, Lippe, Goldstein

[57] ABSTRACT

Disclosed are a method and device for the real-time processing of the responses constituted by pulse signals emitted by secondary radar transponders. The device has an analyzer of sampled magnitudes characterizing the pulses, said magnitudes being prepared by a device located upline with respect to the disclosed device. This device creates a sample message at the sampling rate. Said sample message characterizes the variations of the different magnitudes from one sample to another. A device for the processing of the pulses receives the sample messages and prepares pulse messages. Finally, a device filters the pulses belonging to a same response from the information elements pertaining to the pulse messages and from response detection signals.

29 Claims, 10 Drawing Sheets

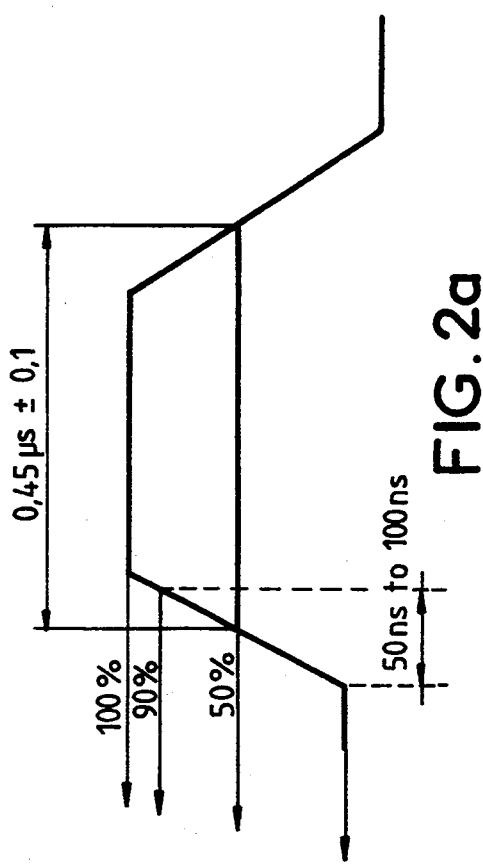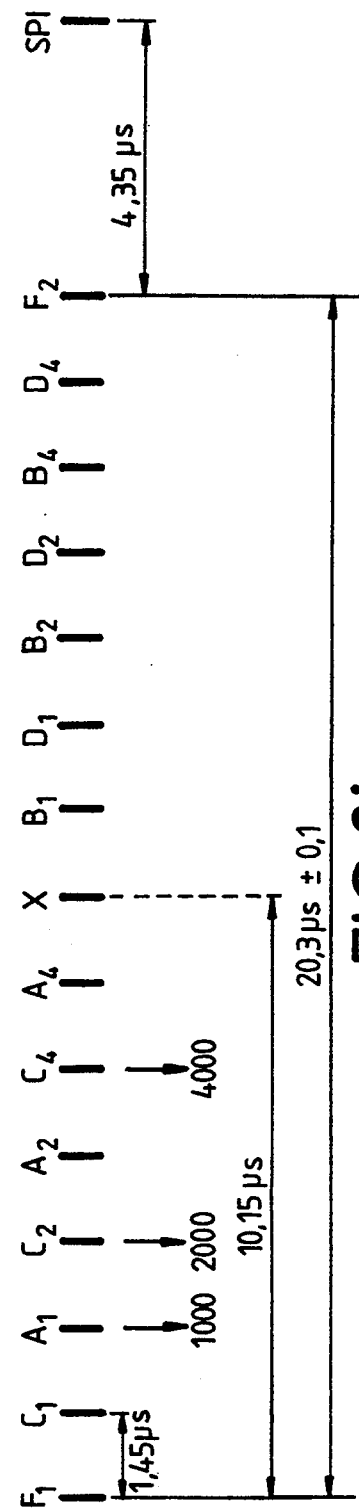

Summary of rules for preparing references of responses

| Value of the SVFs | | Logic sum of the correlation results | Garbling flags | | Pulses used to prepare the reference |
|---|---|---|---|---|---|
| F1 | F2 | BD5+BD6+BD7 | BD1 | BD2 | |
| 0 | 1 | 0 | X | X | F1 |
| 1 | 0 | 0 | X | X | F2 |
| 1 | 1 | 0 | X | X | NRF: 1 → no reference is prepared |
| 0 | 0 | 0 | X | X | F1 and F2 |
| 0 | 0 | 1 | 0 | 0 | F1 |
| | | | 1 | 0 | F1 |
| | | | 0 | 1 | F2 |
| | | | 1 | 1 | Ghost response → the response will be eliminated later |

METHOD AND DEVICE TO IMPROVE THE PROBABILITY OF VALIDITY OF THE CODES OF SECONDARY RADAR RESPONSES

BACKGROUND OF THE INVENTION

The present invention relates to the field of secondary radar receivers.

It is known that a radar can be fitted out with a device called a secondary radar used to obtain, from cooperating carrier vehicles equipped with radar responders, coded information elements on the identity of the carrier and other coded information elements (pertaining to altitude, reporting of radio malfunctions, distress signals etc).

The transponders of carrier vehicles emit responses whenever they are interrogated and, sometimes, they do so spontaneously in a mode of operation with selective addressing, called S mode operation, that can be used also for anticollision functions. Each radar fitted out with a secondary radar must therefore be provided with means enabling it to recognize those responses, among all the responses received, that are responses to its own interrogations, and having detected them, must decipher and validate the code of the response.

The international standardization of responses in S mode is given here below, to facilitate the understanding of the invention, with reference to FIGS. 1 and 2.

As standardized by the International Civil Aviation Organization (ICAO), a response in S mode is constituted by a train of pulses emitted on a carrier frequency of 1090 MHz.

Each train of pulses has a preamble and a message.

The preamble has four identical pulses with a duration of 0.5 $\mu$s each. The first two pulses and the last two pulses are separated from each other by 0.5 $\mu$s. The first pulse and the third pulse are separated from each other by 3.5 $\mu$s.

The message or data block may be short or long. When it is short, the message has 56 pulses of 0.5 $\mu$s each, and when it is long, it has 112. The modulation of the message is done by the position of the pulses which may be at the start or the end of 1 $\mu$s intervals.

The first of these intervals is 8 $\mu$s behind the first pulse of the preamble.

The definition of the standard is shown schematically in FIG. 1. This figure also shows the tolerances as defined by the ICAO.

This figure has three parts: FIG. 1a, FIG. 1b and FIG. 1c. FIG. 1a shows the general shape of an S mode response. It can be subdivided into a same preamble of 8 $\mu$s plus or minus 0.05 $\mu$s and a data block which may be either a short data block of 56 $\mu$s or a long data block of 112 $\mu$s.

FIG. 1b shows firstly the preamble and secondly the data bits of the response block. The preamble has four pulses, two first pulses and two second pulses. The two first pulses have a width of 0.5 $\mu$s$\pm$0.05 $\mu$s and they have a spacing, between them, of 0.5 $\mu$s. At 3.5 $\mu$s$\pm$0.05 $\mu$s from the first pulse of the first block of the two pulses, there is a second block of two pulses identical to the previous one. At 8 $\mu$s from the leading edge of the first pulse of the first block, come the data bits of the data block. The number of these bits is 56 or 112, depending on whether the response is short or long.

FIG. 1c shows the mode of encoding of the data bits belonging to the response block. These data bits are constituted by pulses that are each located in an interval of 1 $\mu$s. Each pulse has a width of 0.5 $\mu$s. It is placed either at the head of the 1 $\mu$s interval or the end of this interval. If it is placed at the head, the pulse conventionally represents a one. If not it represents a zero. Thus, a pulse representing a zero followed by a pulse representing a one will be constituted by single 1 $\mu$s pulse while a pulse representing a one followed by a pulse representing a zero will mean that there is no signal for 1 $\mu$s.

A secondary response is formed by a pulse train. Each pulse represented in FIG. 2a has a leading edge such that, in 50 nanoseconds, a power level representing 90% of the maximum level is reached. This pulse comprises a plateau corresponding to the power level and a decreasing edge. The time difference between the point of the leading edge and the point of the trailing edge having a power level equal to 50% of the maximum power of the pulse is 0.45 $\mu$s$\pm$0.1 $\mu$s. The pulse train shown in FIG. 2b is framed by a first pulse called $F_1$ and a last pulse called $F_2$. These framing pulses are always present. At time intervals that are multiples of 1.45 $\mu$s, behind $F_1$, thirteen pulses are present or not present. The presence or absence of these pulses enables the transmission of an identity or an altitude. The conventional names of the different pulses are shown in FIG. 2b. In certain cases, the pulse train has an additional pulse called SPI located at a distance of 4.35 $\mu$s behind $F_2$, namely 24.65 $\mu$s$\pm$0.2 $\mu$s from $F_1$.

The presence or absence of a secondary radar response is detected by the presence or absence of the pair of framing pulses $F_1$ and $F_2$.

Each response therefore occupies a period of 20.3 $\mu$s and an additional period of 4.35 $\mu$s may be needed for the transmission of the special position pulse SPI. At the speed of propagation of the waves, the total period of 24.65 $\mu$s corresponds to a distance of about two nautical miles. If two aircraft are simultaneously in the major lobe of the antenna at radial distances of less than two miles, at least a part of the pulses of the messages sent by each of the aircraft will arrive in the same time interval. The use of a so-called sum channel and a so-called difference channel makes it possible to create a signal, conventionally called $\Delta/\Sigma$, representing the angular divergence of a signal received with respect to the direction of the axis of the major lobe of the antenna of the secondary receiver. The use of this signal makes it possible, to a certain extent, to separate the responses of two aircraft that are sufficiently distant from each other azimuthally. It is however frequently the case that aircraft flying at different altitudes have differences in radial distance, with respect to the receiver, of less than two miles. The partial coincidence of the responses in time may then distort the decoding of the message sent. There are two cases of mixing to be distinguished. These cases are shown in FIG. 3.

FIGS. 3a and 3b show a first train of pulses coming from a transponder A and a second train of pulses coming from a transponder B. The apparent pulse train received by the receiver is formed by pulses from A and B.

In FIG. 3a, the pulses coming from A and B are separable. There is a garbling of responses but not of pulses. In this case, the known devices can be used to separate the two responses and reconstitute the distances and the codes accurately.

In FIG. 3b, the pulses coming from A and B are not separable, at least in the case of some of them, for the end of a pulse, for example from A occurs while a pulse coming from B has started but not ended. There is a garbling of pulses. In this case, the two responses are no longer separable, and in the known systems, the corresponding responses of A and B are disturbed (false code) or one of them is not detected.

In a standard secondary radar receiver, a device known as an extractor uses the signals received by the antennas and transmitted on the sum and difference channels to create video-analog signals and video-digital signals. The analog signals are known by the names of Log$\Sigma$ and $\Delta/\Sigma$. The signal $\Delta/\Sigma$, as explained further above, represents an angular divergence between the origin of the response and the radioelectrical axis of the antenna. The signal Log$\Sigma$ is a magnitude proportional to the logarithm of the power of the received signal.

The video-digital signals are known by the names Q$\Sigma$ and QRSLS (quantized receiver side lobe suppression). The signals QRSLS indicates that a signal has come from a direction corresponding to a side lobe or minor lobe of the antenna. It therefore enables the elimination of such signals. The signal Q$\Sigma$ is a digital signal that can takes the values 0 or 1. For this signal to have the value 1, it is necessary first of all that there should exist a signal detected by the receiver, i.e. above the detection threshold, and that furthermore the value of this signal should be less than six decibels below the maximum value of the signal. As explained further above, the duration of a pulse is measured at the level of half its power, i.e. six decibels below the maximum level. The duration for which the signal Q$\Sigma$ has the value 1 therefore normally corresponds to the duration of a pulse. In the known receivers, the duration of the pulses is measured by the time during which the signal Q$\Sigma$ has the value 1. In the event of a "garbling" of pulses, the "garbling" is detected by the fact that the apparent duration of a pulse is greater or not greater than a certain threshold.

It will be understood, under these conditions, that the detection of a "garbling" of pulses can be done only if the garbled pulse has a length greater than the duration of the pulse at the maximum tolerance increased by the jitter introduced into the processing devices. It follows therefrom that the known devices have a detection gap for the garbled pulses, the apparent length of which does not exceed the duration thus counted.

It must be noted that, in addition to this information gap, all that the presently used devices do, when they detect the garbling information, is to destroy the garbled information: this corresponds to a loss of information.

The present invention is aimed at improving the probability of detection of the secondary responses, not only in the case of garbling but also in the case of a response with a low signal-to-noise ratio. It is also aimed at improving the validity of the codes detected.

To this end, the invention consists of a digital processing of all the signals presently available at the level of a secondary receiver.

In an improved version, an additional signal called a frequency$\Sigma$ signal is introduced, this signal being obtained from a frequency analysis of the received signal. An analysis of this kind is possible although all the transponders are supposed to emit at the frequency of 1090 MHz for, firstly, there is a tolerance as regards the frequency and, secondly, experience shows that a non-negligible number of transponders make transmission beyond the zone of the tolerances fixed by the ICAO.

The frequency$\Sigma$ signal is a signal representing the frequency of the received signal.

SUMMARY OF THE INVENTION

To achieve the above-defined aim, the method according to the invention consists of a pre-processing operation followed by a processing of the different signals available in a receiver.

The initial processing consists of a method of real-time pre-processing of signals emitted by a radar transponder, the signals of the transponders being constituted by pulse trains called S pulse trains and secondary pulse trains, the pulses having standardized durations and spacings, the method being applicable to a secondary radar extractor located functionally downline with respect to a receiver provided with circuits which, from the signals received, produce analog magnitudes that are conventionally called Log/$\Sigma$, $\Delta/\Sigma$, a digital magnitude Q$\Sigma$ capable of taking the value 0 or 1, the passing to 1 of this magnitude being the sign of the presence of a pulse leading edge LE, and other magnitudes, these other magnitudes being then converted into digital signals by the taking of samples at a rate called a sampling rate, wherein:

a) the taking of samples of the different magnitudes is synchronized by a same clock signal;

b) the rate at which the samples are taken is high enough for several pulses to be taken during the shortest standardized pulse duration;

c) the value of a following sample representing a magnitude is compared with the value of the preceding sample of the same magnitude, the result of the comparison prompting the passing of a bit to 1, it being possible for no bit, one bit or more bits to remain at the value 0, each of the bits that can take the value 1 representing a section or zone of values (hereinafter called a zone) of a slope corresponding to a speed of variation of the magnitude;

d) if the magnitude Q$\Sigma$ remains at the value 1 during a period of time greater than the duration of a normal or S pulse, increased by the value of the duration of the tolerance and the time interval between two successive samples, then pseudo pulse leading edges PLE are generated.

e) examinations are made of the way in which the values on a bit created at the step c vary and, on one bit, there are created a signal known as a clear one signal CLZ which takes the value 1 and keeps this value so long as these values remain simultaneously at values marking a stable state and a garbling signal known as a PGF (pulse garbling flag) signal whenever there is a detection of a change marking a change of the slope zone corresponding to a variation of magnitudes;

f) a message called a sample message is transmitted at subsequent processing stages, the message being renewed at each sample, the message comprising the signals Q$\Sigma$, LE and PLE, PGF, CLZ on one bit and the digital values of the sampled magnitudes on several bits.

The pre-processing operation consists in defining a message, called a sample message, which will represent information elements on a sample of a magnitude, this sample being compared with the previous sample.

It is known that, for the digital processing of an information element in real time, samples of the magnitude to be processed are picked up at a so-called sampling rate. Each sample has a value expressed on a variably great number of bits. A sample represents the instantaneous value of the magnitude processed at the time of the sampling. The converters which convert an analog signal into a digital signal carry out their sampling at a regular rate by means of a clock signal that is given to them by means not shown.

In the present invention, the message is said to be a sample message although it is a message pertaining to several magnitudes and different parameters for it is transmitted on parallel channels of a same data bus and the message is one that is renewed at the same rate as the sampling rate. It is also a sample message inasmuch as sampling rate of each of the magnitudes processed is adjusted by a same clock signal. It is the same clock signal which regulates not only the sampling of the converters but also each of the elementary processing operations.

The magnitudes that are not processed or processed with a smaller number of operations than others and that are in the sample message are delayed as needed so that all the values and correlations between the values transmitted by a sample message are values that correspond to a same sampling instant. The result of the pre-processing of the samples taken at a same instant on the different magnitudes processed is therefore the sample message. This message shall be described in greater detail further below. It may comprise the value of the different magnitudes processed, indications on the sense (rising or descending) of variation of one or more magnitudes obtained by comparison with the previous sample of the same magnitude, and finally and above all information elements on the position of a pulse leading edge or on what, after this pre-processing, appears to be the position of a pulse leading edge.

The presence of a value 1 on one or more dedicated channels of the bus transmitting the sample message will represent a pulse leading edge or the assumed presence of a pulse leading edge.

The processing, proper, will consist initially in setting up the parameters that characterize each of the detected pulses, the start of the pulse being reported in the sample message by the presence of a value 1 on the bus channel dedicated to the pulse leading edges. This first phase of the processing proper consists of the construction, from several sample messages, of a so-called pulse message.

The second phase of the processing consists, as far as the invention is concerned, in using the pulse messages to ascertain that a group of pulses assigned provisionally, owing to their positions, to a same response has a reasonable probability of actually belonging to this response. The examination will be done for each of the pulses by means of information elements contained in the pulse message. The examination consists in ascertaining that each of the pulses, assigned on the basis of its position in time to a response, is defined by parameters whose value is close to a mean value established for the response. This examination of homogeneity of the values of parameters of the pulses attributed to a response shall be done on the magnitudes $Log/\Sigma$, $\Delta/\Sigma$ and if necessary on frequency$\Sigma$.

BRIEF DESCRIPTION OF THE DRAWINGS

A detailed description of the method according to the invention and of an embodiment of a device designed to implement the method according to the invention shall now be described with reference to the appended drawings. Of these drawings:

FIGS. 1a–3b illustrate known data needed for an understanding of the technical aspects of the invention;

FIGS. 1a–1c and 2a–2b are drawings showing the shape of the secondary radar responses;

FIGS. 3a–3b shows forms of garbling;

FIG. 5 is a table that summarizes the use of the bits expressing doubt;

MORE DETAILED DESCRIPTION

Figure 1A:
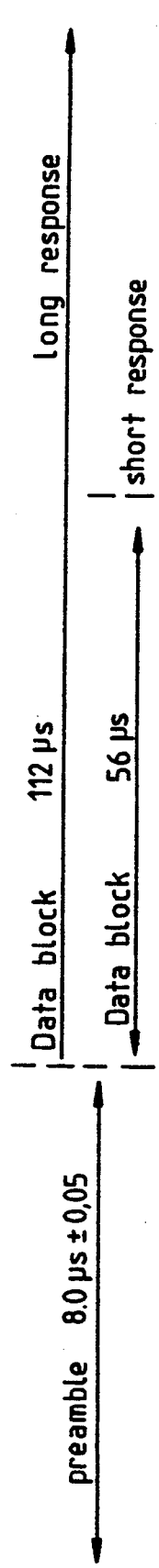
Figure 1B:
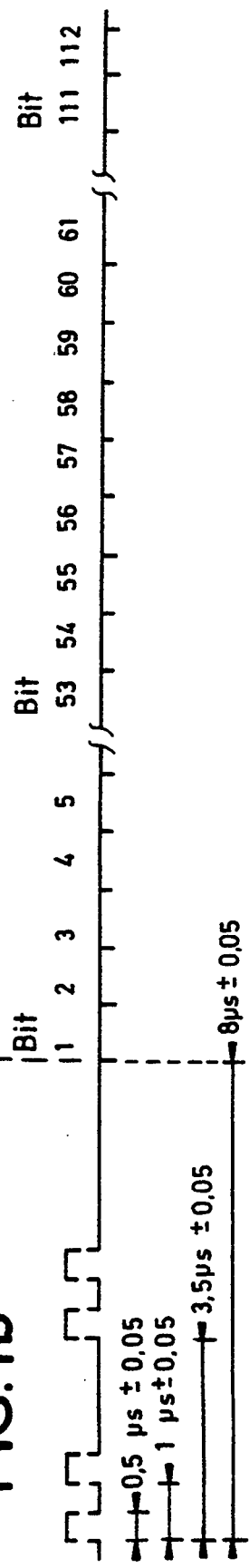
Figure 1C:
Figure 3A:
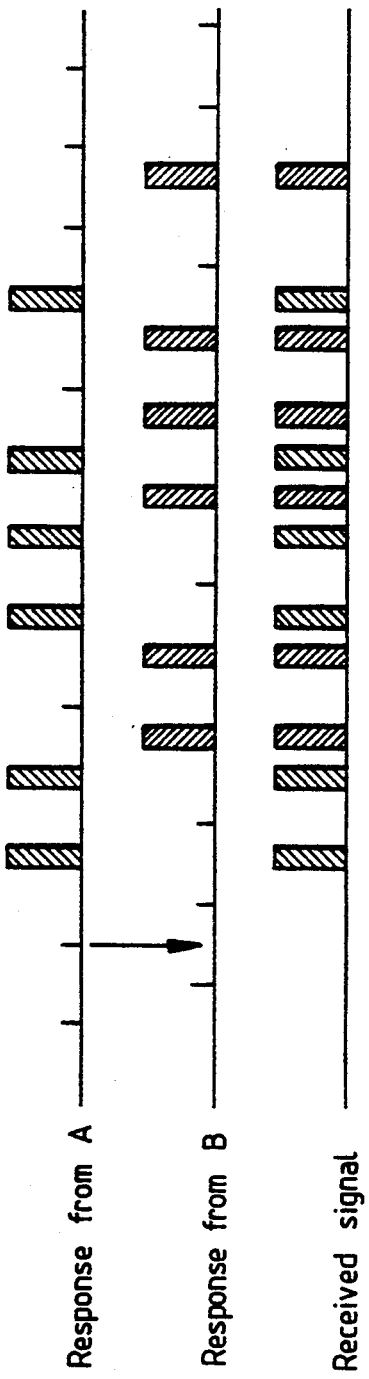
Figure 3B:
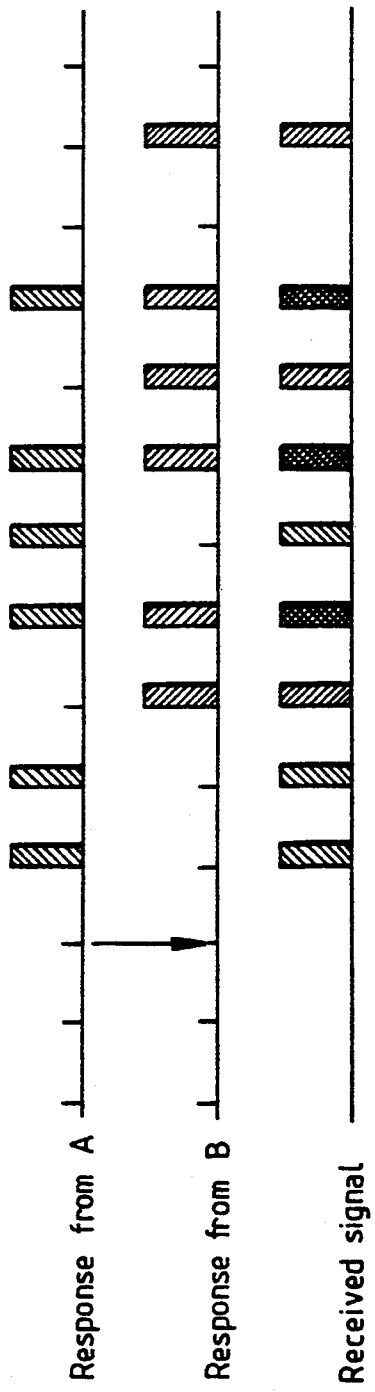

The aim of the pre-processing operation is to marshal a sufficient quantity of information elements to enable the shape of the received signal to be analyzed.

In the preferred embodiment, the results of variation of the magnitude $Log\Sigma$ are divided into five zones representing ranges of values of the slope of $Log\Sigma$.

To do this, each sample value of this magnitude is compared with the value of the previous sample. If the difference is below a first threshold, it is considered that the magnitude is stable, and the bit of a dedicated channel of a bus is taken to the value while the other bits which represent the variation of $Log\Sigma$ remain at the value 0. By contrast, if the difference in value between two consecutive samples is greater than the difference above which it is considered that there is stability, a bit which represents a gentle slope or a steep slope of variation, depending on whether the difference is located within a first interval of variation or, on the contrary, beyond it, is taken to 1 on a dedicated channel. There are thus five bits to characterize the slope of variation $Log\Sigma$ for the sign of the difference is taken into account.

One of the bits represents a variation corresponding to a positive steep slope. Another one represents a variation corresponding to a positive gentle slope. Another one represents a variation corresponding to a steep negative slope, another one represents a variation corresponding to a gentle negative slope and, finally, one bit represents a stable state. Only one of the bits takes the value 1, the other bits keep the value 0.

For the value $\Delta/\Sigma$, it is simply ascertained that the variation is below a fixed threshold, which means that the signal comes from a narrow angular sector. If this magnitude varies beyond the threshold between two consecutive samples, it means that the signal comes from two transponders located in distant angular sectors. It will be concluded therefrom that the signal of the preceding sample comes from a carrier other than that of the current sample.

When the signal becomes weak, owing to its increasingly smaller difference from the ambient noise level, it is increasingly liable to undergo major variations. This is why, according to the invention, the level of the thresholds for $log\Sigma$ and $\Delta/\Sigma$ is fixed, in taking account of the value of $log\Sigma$. The lower the value of $Log\Sigma$, the greater is the value of the threshold fixing the so-called level of stability. The level of Log$\Sigma$ is also taken into account to fix the intervals at which it is considered that there is a gentle slope or a steep slope. This variation of the level of the thresholds makes it possible to guarantee a constant number of samples per pulse ($\approx$5 for a sampling clock at 20 MHz) irrespectively of the level of the signal received.

It has been seen further above that radar transponders can emit S mode responses or secondary responses. When the signal Q$\Sigma$ remains at 1 for a value greater than the duration of a secondary pulse or an S mode pulse, it is deduced therefrom that several pulses overlap one another, but it is not known if the overlapping pulses correspond to S mode pulses or secondary pulses.

To avoid losing information elements, pseudo leading edges are generated in two ways, and the edges thus generated are each assigned to a channel. The pseudo leading edges thus generated are called S pseudo leading edges (PLES) or normal pseudo leading edges (PLEN) depending on whether they are generated with the assumption that the responses are S reponses or that they are secondary responses.

The pseudo edges are generated at a pulse length in front of the trailing edge of the signal Q$\Sigma$ if the duration of Q$\Sigma$ is greater than the maximum duration of a pulse and smaller than the duration of two pulses, and behind the leading edge of Q$\Sigma$ at time intervals equal to the duration of a pulse and throughout the duration of Q$\Sigma$ if the duration of the signal Q$\Sigma$ is greater than the duration of two pulses.

In the version of the invention applicable downline with respect to a secondary radar receiver that has a frequency or phase discriminator circuit and emits a frequency$\Sigma$ signal, the clear zone signal (CLZ) keeps the value 1 only if Log$\Sigma$, $\Delta/\Sigma$ and frequecy$\Sigma$ are stable at the same time. If one of these signals varies beyond a significant threshold, then it means that this signal does not come from the same source as the signal represented by the previous sample. The observation of the instant of instability of one of these magnitudes will then make it possible to position the pseudo pulse leading edges more efficiently. The procedure is explained here below with reference to FIG. 4.

Figure 4A:
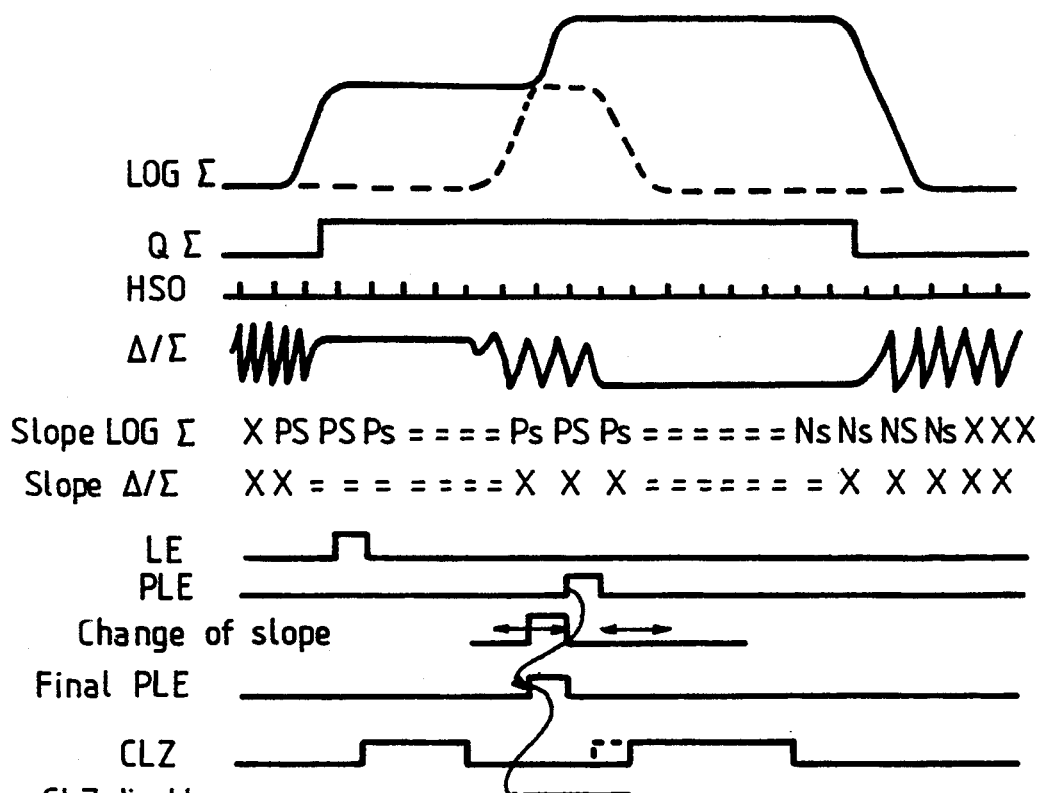
FIGS. 4a–4e show the way to exploit the sampled magnitudes to carry out a real-time analysis of the signals received and to deduce the positions of the pulses therefrom.
Figure 4B:
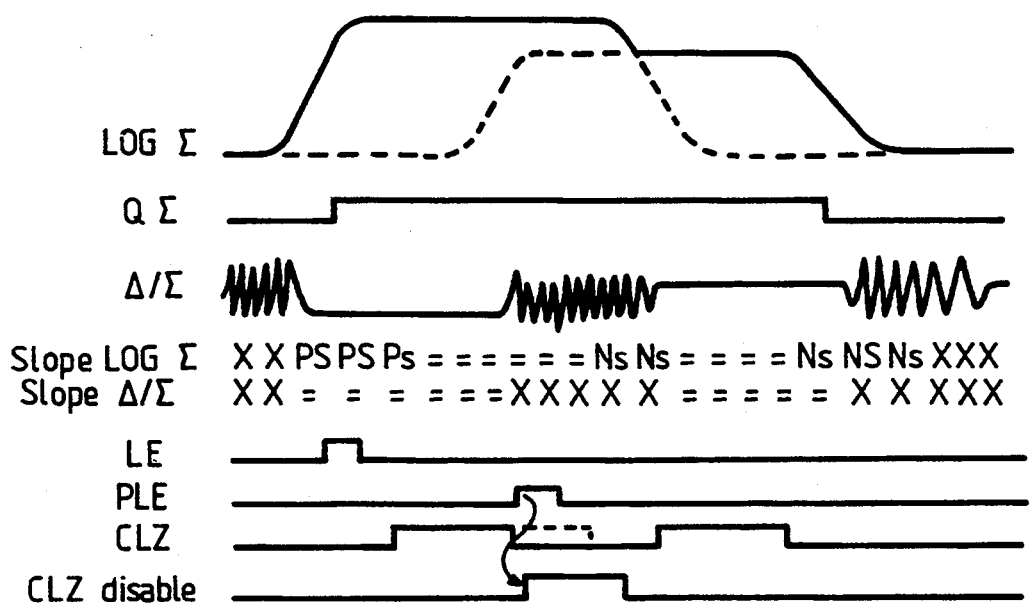

This figure describes two cases in FIGS. 4a and 4b respectively.

Each of these figures shows a set of several curves each representing the amplitude of a magnitude as a function of time. Those points of these curves that are located on a same vertical correspond to one and the same instant.

From top to bottom, there are Log$\Sigma$, Q$\Sigma$, a scale representing time subdivided into 50-ns steps (in FIG. 4a only), $\Delta/\Sigma$, a line representing the slope zones Log$\Sigma$, called slope Log$\Sigma$, and another representing the slope zones of $\Delta/\Sigma$, called slope $\Delta/\Sigma$, a line representing the leading edges (LE) detected by the variation of Q$\Sigma$, a line representing the leading edges generated by taking account of the duration for which Q$\Sigma$ remains at 1 (PLE), a line representing the position (corrected if necessary) of the leading edge (final PLE) in FIG. 4a only.

Finally, there is a line reprsenting a clear zone signal (CLZ) where the values of the magnitudes exploited are stable and a line representing a signal which has the value 1 if at least one of the magnitudes is unstable, called CLZ disable.

In FIG. 4a, it was assumed that a start of a low level pulse was followed by a higher level pulse without the difference in level being greater than 6 dB. This is expressed in the level of the signal Log$\Sigma$ by a positive slope followed by a stable state represented in the first line of FIG. 4a by a horizontal line and then, at the instant of arrival of the pulse with the highest level, by a new positive slope followed by a stable state and a negative slope. The end of the first pulse, shown in dashes, is masked by the highest level of the second pulse. On the second line of FIG. 4a, which represents the signal Q$\Sigma$, it is seen that the signal remains at 1 throughout the duration of the two overlapping pulses, because the difference in level between the two pulses is smaller than 6 dB. The examination of Q$\Sigma$ alone, with the existing processing operations, will therefore enable the generation of only one leading edge.

According to the invention, the examination of the abnormal duration will enable the generation, initially, at 450 ns before the trailing edge of Log$\Sigma$, of a pulse representing a pseudo leading edge (PLE), the position of which is shown in the line (PLE) of FIG. 4a. According to the same principle, a pseudo leading edge S is generated in front of the trailing edge of Q$\Sigma$. This generation is not shown in FIG. 4a.

This example will be used to explain how the information elements thus created are used, firstly to detect the pulse "garbling" and, secondly, to generate a precise position of the first and second pulse participating in the "garbling". The first leading edge LE is generated in a standard way. The second leading edge PLE is, in this case, generated from the position of the trailing edge. This generation, created according to a temporal criterion, will be corrected if necessary by examining the slope of Log$\Sigma$. On the slope Log$\Sigma$ line, the sign X represents a value of Log$\Sigma$ below the detection threshold, the signs PS or NS represent a steep positive slope or steep negative slope, the signs Ps or Ns represent a positive gentle slope or negative gentle slope and the signs=represent a stable state of the slope. Each positive steep slope sign that is not associated with a change in the state of Q$\Sigma$ gives rise to the generation of a PLE. It must be seen that the PLE thus generated is not redundant with respect to a temporally generated PLE.

Figure 4C:
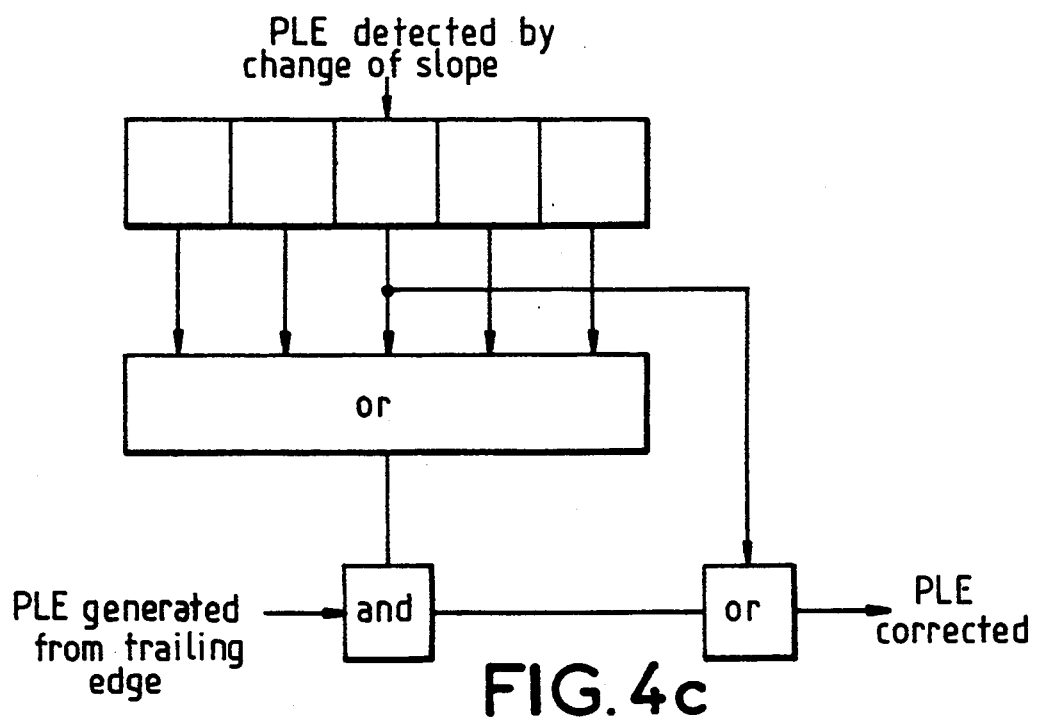

The principle of this verification and its result are explained here below with reference to FIG. 4c. The position of the temporally generated leading edge PLE, taking account of the tolerances with respect to pulse widths and the jitter introduced by the sampling, may be in five consecutive windows of 50 ns each. A search is made to see if a steep slope bit is present in these windows. In the event of the presence of such a bit, it is concluded that there is a case of redundancy and the PLE is positioned at the place of the steep slope bit or at the center of the zone in the event of plurality. If there is no such bit, the PLE is kept at the position obtained by the time lag with respect to the trailing edge, of the standardized duration of a pulse and there are therefore two PLEs. It is observed, on the basis of the explanations given with respect to this example, that this procedure enables the detection of a leading edge when the total duration of the signal Q$\Sigma$ is not greater than the maximum duration of a pulse.

Figure 4D:
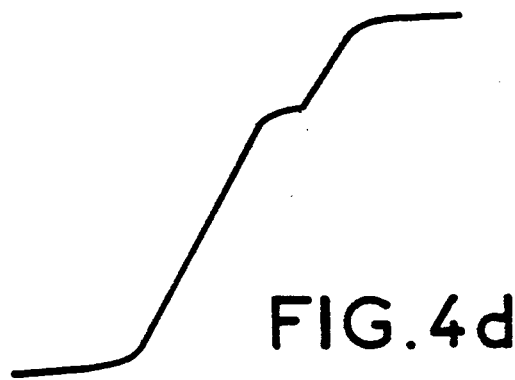
Figure 4E:
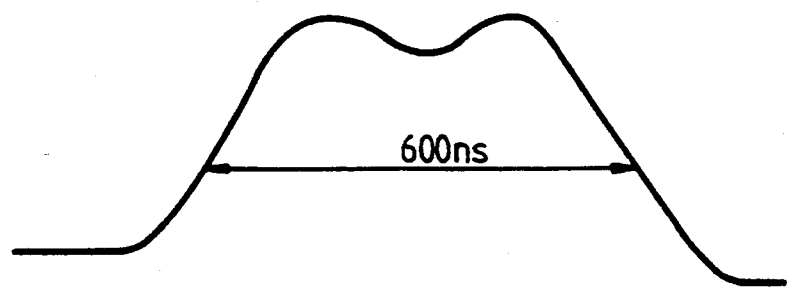

Thus, FIG. 4d shows a part of a curve Log$\Sigma$ with a steep slope, a gentle slope and again a steep slope. Although the corresponding bits are separated by a minimum of 100 ns, it is possible, given the tolerance values, that the trailing edge of the second pulse will occur at the same time as or even before the trailing edge of the first pulse. Another possible case shall be illustrated with reference to FIG. 4e which shows a pulse with a duration of less than 600 ns, during which a change in sign is recorded on the value of the slope of Log$\Sigma$. It is concluded therefrom that there is a pulse "garbling" and a signal called PGF is emitted on a dedicated channel to indicate this fact during a subsequent processing operation. The explanations given here above with reference to FIGS. 4a, 4c, 4d and 4e make it possible to observe that one of the aims of the invention, namely the more efficient detection of the garblings and the more efficient detection of each pulse, is achieved by making use of Q$\Sigma$ and of the Log$\Sigma$ slope bits, since this enables the detection of the garblings and the positioning of the additional leading edges while the duration of Q$\Sigma$ remains smaller than the possible duration of a pulse. This exploitation alone could however prove to be insufficient in the event of "garbling" between pulses that have a same level of power and are almost simultaneous. The using of additional magnitudes shall now be illustrated by the case shown in FIG. 4b.

This figure shows a case where the first pulse has a higher level than the second pulse, the difference in level being still below 6 dB. The signal Q$\Sigma$ remains at 1 for a duration greater than the duration of a pulse. The leading edge of the second pulse, shown in dashes, is masked by the higher level of the first pulse. An examination of the stable states on Log$\Sigma$, $\Delta/\Sigma$ and, in the version comprising the frequency discriminator (not shown), frequency$\Sigma$, will enable the determining of the pulse having the highest power level. In FIG. 4b it can be seen, by examining the slope $\Delta/\Sigma$, that there is a mixture of signals while the single piece of information on Log$\Sigma$ is too small to enable the detection of a mixture of signals. The signal CLZ returns to zero. It is this signal that makes it possible to assign the samples to a particular leading edge. The fact that this signal returns to 0, by the fact that $\Delta/\Sigma$ or frequency$\Sigma$ is no longer stable, interrupts the assigning process and causes the other signal, called "CLZ disable" to be taken to 1.

The appearance of a negative slope on slope Log$\Sigma$ marks the end of the signal with the highest power. It is thus possible, for Log$\Sigma$, to assign the samples up to the appearance of the signal Ns to the first pulse leading edge.

It is therefore observed that the pre-processing method according to the invention makes it possible to obtain and save a maximum amount of information for the subsequent processing.

The end of the pre-processing is constituted by the sample message defined further above. It is observed that the position of the pseudo leading edges of pulses is constituted by positions corrected to take account of the discontinuities of the information elements on Log$\Sigma$, $\Delta/\Sigma$ and, possibly, frequency$\Sigma$.

Starting from this sample message, it is possible to start the first part of the processing operation. It consists in creating a pulse message from one or more sample messages.

The pulse message, like the sample message, is constituted by magnitudes sent on parallel channels of a bus. Like the sample message, it is renewed regularly at the sampling rate. This message comprises the following, on dedicated channels:

a magnitude called LE which indicates the position of a pulse leading edge;

a magnitude called PLE which indicates the position of a pulse leading edge generated from a detected pulse trailing edge;

a magnitude called XLE which indicates the position of a pulse leading edge generated from a detected pulse leading edge, in a manner that shall be described further below;

a magnitude called Log$\Sigma$Sum obtained by taking the sum of the value of the samples Log$\Sigma$ that are assigned to a same pulse, i.e. that are located in an interval where the signal CLZ continually keeps the value 1;

a magnitude called $\Delta/\Sigma$Sum. obtained by taking the sum of the value of the samples $\Delta/\Sigma$ assigned to a same pulse;

a magnitude called SVF (significant value flag) that can take the values 0 or 1. This magnitude is at the value 1 if it has not been possible to associate samples, enabling the computation of the values for Log$\Sigma$ and $\Delta/\Sigma$, with a detected pulse leading edge;

magnitudes called NumSam representing the number of samples that have been used to establish the value of parameters characterizing the pulse, .Log$\Sigma$Sum, $\Delta/\Sigma$Sum, Frequency$\Sigma$Sum.

Only one NumSam is set up for Log$\Sigma$, $\Delta/\Sigma$ and frequency$\Sigma$.

Finally, the pulse message may comprise other values, and notably, in an improved version, the value Frequency$\Sigma$Sum, the meaning of which has been given further above.

In a particular embodiment that shall be described further below, parameters designed to accelerate the subsequent processing are introduced. These parameters are notably a magnitude called NextLE, representing the number of elementary periods at the end of which the next leading edge is found. This indication enables the direct addressing of the processing at an address representing the next pulse. The accelerating parameters also include a flag magnitude called SVF which indicates that the magnitudes Log$\Sigma$Sum, $\Delta/\Sigma$Sum and, as the case may be, frequency$\Sigma$, are associated with the pulse leading edge LE. This indication enables the speedier elimination of the pulses that cannot be processed.

It must be noted, at this stage, that the duration of the processing, expressed in number of elementary processing time periods, is known for each step of the processing operation and especially for the pulse message. The result thereof is that the presence of a magnitude 1 on the channels LE or PLE represents the arrival of a pulse at a known prior moment. The elementary processing time is the time interval between two consecutive samples.

The last phase of the processing operation according to the invention, namely the processing of the responses from the pulse messages, is preceded by two processing operations which do not form part of the invention but shall be described briefly here below to provide for an understanding of the second stage of the processing according to the invention.

One of the processing operations is a filtering of the S mode responses, while the other is the detection of the secondary radar responses. The filtering of the S mode responses comprises a detection of the responses and then an elimination of all the pulses, represented in the case of the processing according to the invention, by the different corresponding pulse messages belonging to the detected S mode responses.

A search is made for the presence, if any, of an S mode response at the end of each of the elementary time periods. The detection method is used to determine whether the detected S mode response is a short S mode response (duration of 64 μs) or a long S mode response (duration of 120 μs).

To this end, the pulse leading edges are memorized in a register with series input and parallel outputs. The information contained in the register is shifted at the sampling rate. The register has a number of compartments greater than the number obtained through the division of the duration of a short S mode response by a sampling period P. The number of compartments is such that it enables the memorizing of the pulse leading edge No. (56+c) of a long S mode response while the first pulse of the preamble of this response is still present in the register. The parallel outputs of the register are connected to two correlators formed in a standard way by AND gates.

The first correlator is aimed at detecting the simultaneous presence of the leading edges of the four pulses of the preamble and the b last pulses of an S mode response which is short and the second correlator is aimed at detecting the simultaneous presence of the first pulses which marks the fact that they are received from an S mode response that is long. At output of the correlators, therefore, there is an information element relating to the presence of an S mode response and to its length. It is therefore possible to adapt the following part of the processing of the response thus detected, especially its filtering, to the length of the response. The filtering, namely the elimination, from the pulses, of the S mode responses so as to process only the other responses of the secondary radars, is done by considering not only the temporal position of each of the pulses of the preamble but also their level of power and their angular divergence.

Normally, all the pulses that belong to a single response are at the same power level and have the same angular divergence. It is therefore possible for a pulse that is well positioned in time but has a power level or angular divergence different from the mean of the other pulses of the response to be a pulse belonging to another response.

The power of each of the pulses well positioned in time and thus capable of constituting a part of the S mode response, is compared with the mean power level of the pulses set up beforehand. If the difference in power between the examined pulse and the mean level is below a previously fixed threshold, then the pulse is considered to form part of the S mode response. The same is done for the angular divergence. The value of the thresholds can be modified as a function of the mean value established for $Log\Sigma$. The weaker the response, the more it is subject to major variations. It would therefore be advisable to raise the value of the comparison threshold for the low mean power values. This adjustment of the threshold is done by successive stages.

After detection, the pulses of the messages belonging to S mode responses are eliminated.

The second processing operation, prior to the execution of the second phase of the processing operation according to the invention, consists in detecting secondary radar responses.

This detection is assumed whenever a pair of framing pulses $F_1 F_2$ is detected. These pairs of pulses are at a distance of 20.3 μs±100 ns from each other. A 50 ns square signal (BPD or bit pair detection signal) is generated to indicate the presence of a response at the distance of the pulse $F_1$.

The code of the response is detected from the existence of pulse leading edges at the theoretical positions of the pulses in a secondary radar response.

Finally, the response detection device emits two garbling presumption flags, respectively BD1 and BD2, on the dedicated channels of a bus:

BD1 if a response is detected 24.65 μs at most after the current response and at successive instants:

$$\eta \times 1,45 \mu s \pm 0,15 \mu s \ 1 \leq \eta \leq 17$$

BD2 if a response is detected 24.65 μs at most before the current response and at successive instants:

$$\eta \times 1,45 \mu s \pm 0,15 \mu s \ 1 \leq \eta \leq 17$$

It has been seen further above that the duration of a response, including the position pulse (SPI), is equal to 24.65 μs.

Should BD2 be sent, it means that there is a risk of confusion between the last pulses of the previous response and the first pulses of the current response.

Should BD1 be sent, it means, on the contrary, that there is a risk of confusion between the last pulses current response and the first pulses of the following response.

When the above-mentioned two processing operations which are outside the present invention have been carried out, the second phase of the treatment according to the invention can begin. It should first of all be reported that each of the pulse messages created during the first stage of the processing operation is stored, in a way that is ordered in time, in a buffer memory. This memory should be large enough to be capable of containing at least the number of pulse messages that have been received throughout the duration of a recurrence.

Preferably, the memory compartments of the memory could contain at least the number of bits contained in a pulse message. Consequently, there could be a one-to-one correspondence between the address of the memory and the order of arrival, hence the instant of the pulse message.

It should then be recalled that, at this stage of the processing, the contents of the messages (altitude or identification for example) are available for each response detected (BPD). These contents have been set up on the basis of the existence of energy detected in the signal $Log\Sigma$ at theoretical positions where they are liable to be found, given the standardized coding used for the responses.

The reason why the processing operation, which shall be described here below, is worthwhile is that it validates the code thus detected by assigning it reliance bits, and also that it makes it possible to compute mean values for the magnitudes $Log\Sigma$, $\Delta/\Sigma$ and, for receivers fitted out with frequency discriminators, to compute the value of frequency$\Sigma$.

It may also consist in setting up different indicator flags.

The validation of the code shall be established by verifying that, for each pulse detected as belonging to a response as a function of its position, there is a correlation with a mean value of the response. The position of a pulse, and hence that of the message characterizing it, is identified by its address. The mean value shall be set up iteratively. The first mean value shall be established on the framing pulses if a pulse message characterizes them. It is recalled that, in the processing operation according to the invention, when working on the position of the pulses, the operation is done on the pulse leading edges represented by signals LE on the dedicated channels. When no sample is available to compute the parameters of the pulse, the pulse message, containing the leading edge indication, comprises a flag SVF which is equal to 1. Consequently, if SVF is equal to 1 for one of the two framing pulses, then only the pulse for which SVF=0 will be used. If SVF is equal to 1 for both the pulses $F_1$ and $F_2$, it is not possible to establish a reference, and the next processing operation will be provided with information thereof by the sending of a bit called NRF on a dedicated channel. The value of this bit will be taken to 1. If SVF is equal to 0, for both pulses, then in principle both pulses are can be used.

In this case, an additional test will be made to ascertain that the two pulses correlate. Two pulses are said to correlate if the differences between two identical magnitudes, characterizing each of the pulses, are below a determined threshold. The threshold may be variable, for example by stages, to take account of the absolute level of the magnitudes, and hence to have a tolerance to noise for the low levels.

To verify the correlation between the two framing pulses, therefore, the differences are calculated between the values Log$\Sigma$, $\Delta/\Sigma$ and, possibly, frequency$\Sigma$ of the two pulses. Doubt bits, BD7, BD6 and BD5 respectively, take the value 0 if there is correlation or the value 1 if, for the magnitude considered, there is no correlation. If there is correlation for all the magnitudes tested, i.e. if the logic sum of the bits expressing doubt (hereinafter called doubt bits) is equal to 0, then the mean reference value for each of the magnitudes will be the value obtained by computing the sum of the values contained for this magnitude in the pulse messages of $F_1$ and $F_2$, and by dividing this sum by the sum of the numbers of samples of the first and second pulses. For example, for Log$\Sigma$, the mean value will be obtained according to the formula:

$$\frac{Log\Sigma Sum1 + Log\Sigma Sum2}{NumSam1 + NumSam2} \quad (1)$$

where:
Log$\Sigma$Sum1 is the Log$\Sigma$Sum of the 1st pulse $F_1$
Log$\Sigma$Sum2 is the Log$\Sigma$Sum of the 2nd pulse $F_2$
NumSam1 is the NumSam of the 1st pulse
NumSam2 is the NumSam of the 2nd pulse These two magnitudes are in the pulse message of each of the two pulses.

If the logic sum of the doubt bits is equal to 1, i.e. if at least one of the doubt bits is equal to 1, then it is assumed that the two pulses do not correlate, and it is then necessary to choose either one of them or, possibly, to take or reject both of them. To make this choice then, the values of the "garbling" assumption bits BD1 and BD2 are considered. These bits, it must be recalled, indicate a probability of garbling with a following or preceding response. If BD1 and BD2 are at 0, it means that there is no response "garbling" and, in this case, the mean values will be established on the first pulse.

If one of the doubt bits is at 1, it means that it is possible for $F_1$ or $F_2$ to be garbled with any pulse of a preceding or following response. In this case, the mean reference value will be set up solely on the pulse which, in principle, has not been garbled i.e. $F_1$ if BD1=1 and $F_2$ if BD2=1.

Finally, if BD1 and BD2 are equal to 1 and if both pulses do not correlate, then the response is considered to be a ghost response. It will be eliminated in the remaining part of the processing.

The way in which the bits BD1, BD2 and BD5 to BD7 are taken into account to establish the initial value of the reference is specified in the table of FIG. 5. In this table, the cross in the columns BD1 or BD2 is designed to mark the fact that the value of the bit is not taken into account. In the column BD5+BD6+BD7, the value of BD5 is taken into account to establish a logic sum only in devices provided with a frequency discriminator. A 1 in the columns $F_1$ or $F_2$ means that there are no samples available to compute the value of the parameters of the pulse (SVF=1).

Once the reference values have been established, it is possible to assign reliance bits to each of the pulses which, by their position, may belong to the studied response of the reliance bits. These bits, called BC5 for the correlation, if any, on frequency$\Sigma$, BC6 for the correlation on $\Delta/\Sigma$, and BC7 for the correlation on Log$\Sigma$, take the value 0 if the correlation with the reference is right and 1 if this is not the case.

The criterion of right correlation is the same as in the comparison of the pulses $F_1$ and $F_2$.

If the correlation is not obtained, an additional processing operation using the information element nextLE is performed. It is recalled that this information element represents the number of elementary time periods between the current pulse and the next pulse. It is also recalled that the selection of the addresses of the pulse messages belonging to a detected response is done by considering the theoretical temporal position of the leading edges LE of the pulses. Given the tolerances and jitter related to the sampling, a pulse liable to belong to the response may have seven possible consecutive addresses. In this group of seven addresses, there may be more than one significant pulse message. This is why, if the first of the pulses of this group does not correlate, a check is made, by means of the information element nextLE, to see whether the next pulse is located in this group of addresses. If this is the case, then the correlation processing operation is started again with the next pulse.

The decision to hold back or not hold back a non-correlating pulse is taken in considering not only the logic sum of the reliance bits assigned to this pulse but also the value of the doubt bit $BD_3$ and $BD_4$ asssigned to each pulse. The length of a response comprising a pulse with a position SPI is 24.65 $\mu$s. This duration represents seventeen 1.45 $\mu$s intervals between theoretical positions of pulse leading edges. The duration between two responses (two pulse leading edges $F_1$) is measured for this function in terms of the number of intervals between two theoretical pulse positions. There may be garbling if this duration is equal, within tolerances, to a whole number "n" of intervals smaller than 17.

Each pulse can thus receive a doubt bit BD3 or BD4 assigned in the same way as BD1 and BD2 for the framing pulses.

The decision to hold back or not hold back a pulse is taken in the same way as the one that was explained further above and that was the object of the table of FIG. 5, BC5, BC6, BC7, BD3 and BD4 respectively replacing BD5, BD6, BD7, BD1 and BD2.

At the end of this operation, the pulses that are part of the response are known, and it is therefore possible to establish the corrected or definitive message of the response.

There is also another operation that is carried out. This operation consists in computing the mean value of each of the parameters of the response. This value is established by taking account of all the pulses that have participated in the response. Thus, for example, for Log$\Sigma$, the overall mean value is computed according to the formula:

$$\text{Log } \Sigma_M = \frac{\text{Log}\Sigma\text{Sum1} + \text{Log}\Sigma\text{Sum2} + \ldots \text{Log}\Sigma\text{sum}N}{\text{NumSam1} + \text{NumSam2} + \ldots \text{NumSam}N}$$

N represents the number of correlated pulses that have participated in the response.

These values are then used to set up correlations among successive responses and ascertain that these are responses with a common origin.

A device that can embody the invention shall now be described with reference to FIGS. 6 to 9.

Figure 6:
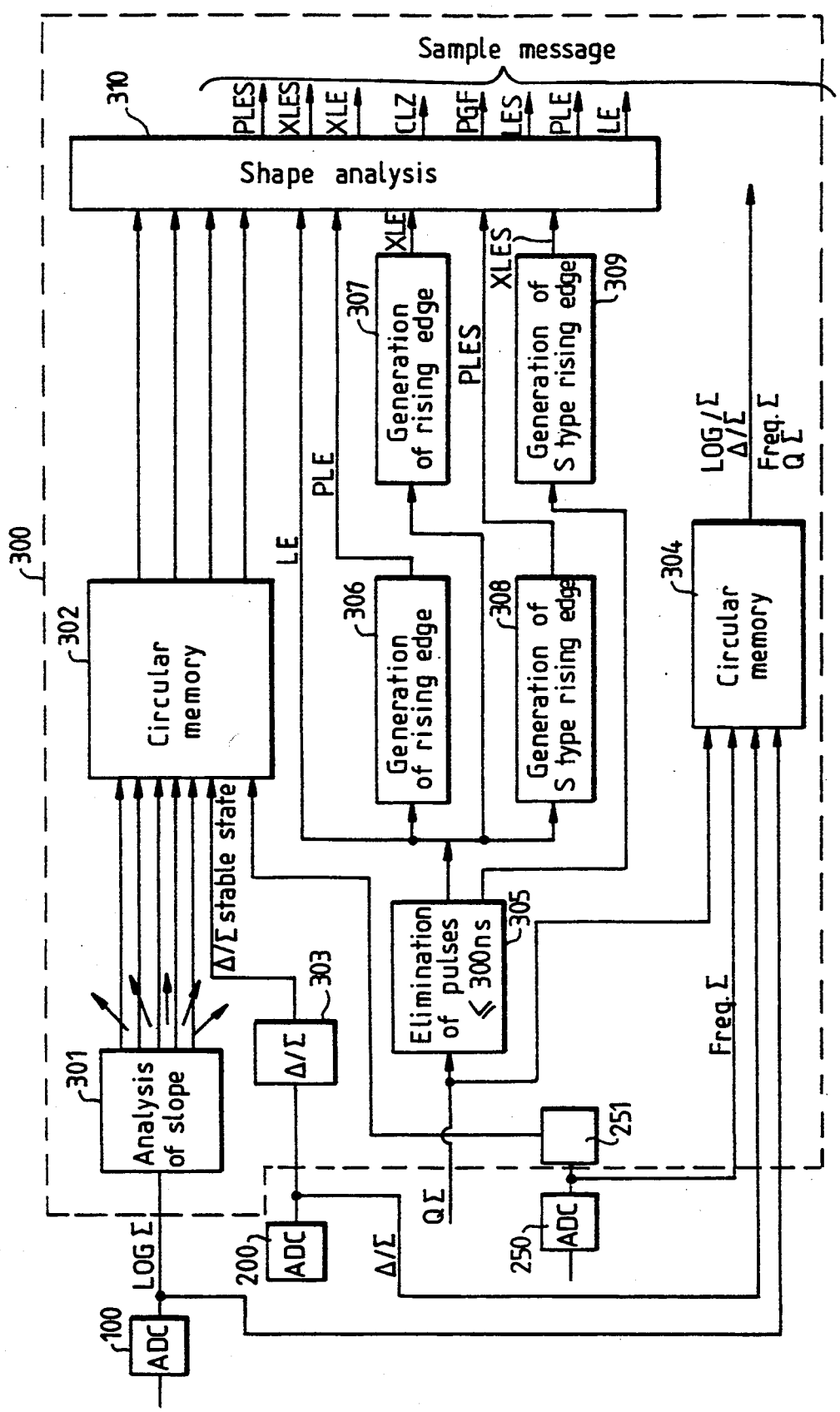
FIG. 6 represents the part of the device generating the sample message from the different magnitudes received.
Figure 7:
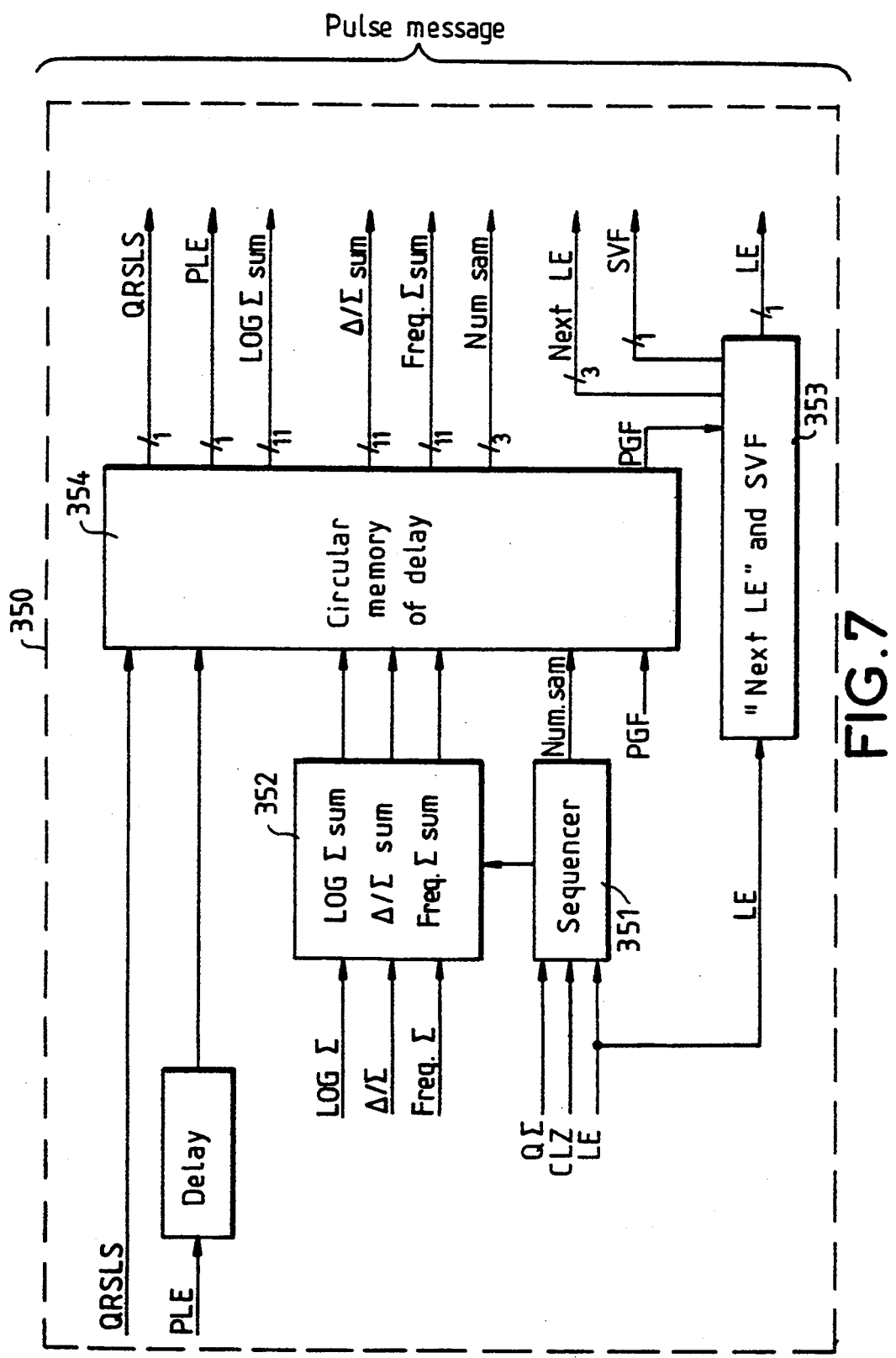
FIG. 7 shows the part of the device generating the pulse message out of sample messages.
Figure 8:
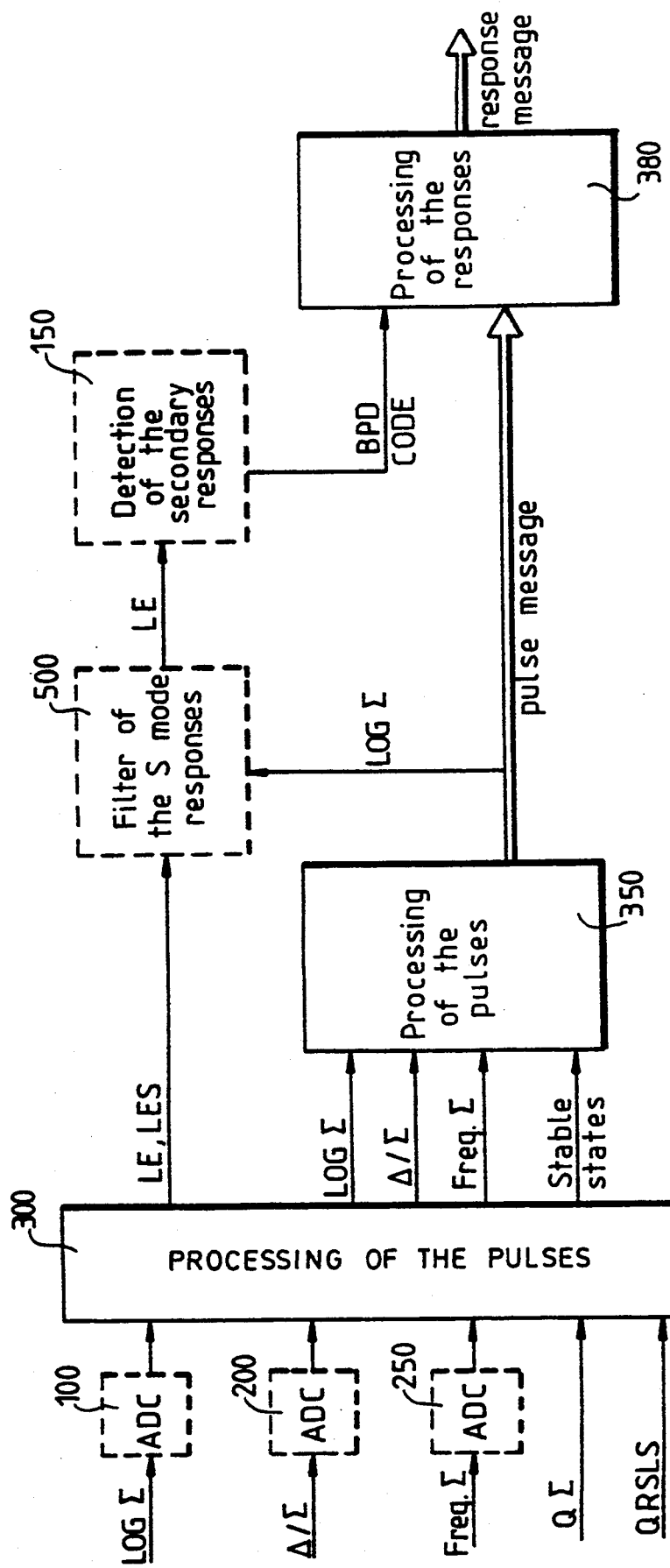
FIG. 8 is a functional diagram designed to enable an understanding of the way in which the devices of FIGS. 6, 7 and 9 are placed functionally with respect to one another.

FIG. 6 shows a device 300 generating the sample message.

This device receives the samples of the magnitudes Log$\Sigma$, $\Delta/\Sigma$ and frequency$\Sigma$ from converters 100, 200, 250. It also receives the digitized magnitude Q$\Sigma$. The samples are taken simultaneously at a rate of 20 MHz upon activation by a clock which is not shown.

The magnitude Log$\Sigma$ is introduced into a device 301. This device compares the value of a following sample with the value of a preceding sample. The result is constituted by the five slope bits explained further above. Each five-bit message at output of the analyzer 301 is stored in a circular memory 302.

Similarly, the samples of $\Delta/\Sigma$ and frequency$\Sigma$ are introduced into variation analyzers 303, 251 which compare the value of the following sample with the value of the preceding sample. The result of this comparison on one bit, whether a stable state or a variation, is itself also introduced sequentially into the memory 302. The devices 303 and 251 have a small circular storage memory designed to compensate for the differences in processing time between the devices 301 and 303. Thus, each message on seven bits (5+2) of the memory 302 pertains to a same sampling instant.

The values of the samples of the magnitudes themselves are stored sequentially in a circular memory 304. The storage in the memories 302 and 304 is designed for the preserving of the information elements during a first phase for the detection and generation of leading edges carried out on the signal Q$\Sigma$. This signal is introduced into a device 305 designed to eliminate the pulses having a duration of less than 300 ns.

At the sampling rate, the values of Q$\Sigma$ are sent to a shape analyzer 310.

This device also receives, from other channels, the results of the processing of the signal Q$\Sigma$ in two parallel circuits for the generation of leading edges. These circuits are constituted by devices 306, 307 and 308, 309.

The device 306 counts the consecutive samples during which Q$\Sigma$ keeps the value 1. If this value reaches 13 (i.e. 600 ns), then a leading edge PLE is generated and sent to the shape analyzer 310. A second element of the circuit 307 receives the values of Q$\Sigma$ and generates a pulse leading edge XLE when the counting shows 19 consecutive samples at the value 1. Another XLE is generated when the counter passes by 28, 37, i.e. every 450 ns.

The second circuit 308, 309 generates leading edges PLES and XLES in the same way, but for consecutive numbers of samples which correspond to the durations of the S type response pulses. The shape analyzer 310 receives sequentially the following value corresponding to a same sampling instant: the values of the slopes of Log$\Sigma$, $\Delta/\Sigma$, Frequency$\Sigma$, the initial positions of the LEs, PLEs, XLEs, PLESs and XLESs. This circuit has logic circuits, namely AND, OR gates etc which, in a manner known per se, prepare the corrections of the position of the leading edges, the clear zone signal CLZ and the garbled pulse signal PGF. All these magnitudes and the magnitudes Log$\Sigma$, $\Delta/\Sigma$, frequency$\Sigma$ and Q$\Sigma$ constitute magnitudes of the sample message.

The sample messages have or do not have a pulse leading edge LE indication. With the values of the sample messages located between two sample messages comprising an LE, a first sample message and second sample message are assigned to the former to constitute the pulse message. The information contained in the pulse message is therefore essentially the position of the pulse leading edges. It is this information that shall be used hereinafter to identify the sequences of pulses which, by their temporal positions, are liable to belong to a same response. When the positions of these pulses have been detected, it will be necessary, according to the invention, to ascertain that the pulses thus detected truly belong to the response. This shall be done, as explained further above, by comparing the values of magnitudes relating to the pulse with a mean value. It is necessary, beforehand, to establish the values of the magnitudes of the pulse. This is the object of the device 350 shown in FIG. 7. This device receives the sample message.

The magnitudes Q$\Sigma$, CLZ and LE are received by a sequencer 351 which controls summators 352 which add up the values of samples of each of the magnitudes Log$\Sigma$, frequency$\Sigma$ and $\Delta/\Sigma$. A device 353 receives the magnitudes LE and PGF and prepares or transmits the magnitudes LE, nextLE and SVF. The sequencer 351 counts the number of samples assigned to each magnitude introduced into the summator. The result is constituted by the magnitude NumSam.

The magnitudes at output of the devices 351 and 352 are introduced into a circular memory 354 designed to keep the values while the device 353 prepares the signal nextLE. At output of the device 350, there are pulse messages. This device 350 has the magnitudes Log$\Sigma$-Sum, $\Delta/\Sigma$Sum, NumSam, nextLE, SVF, LE, PLE, XLE, LES, XLES, PLES which have been defined further above.

These pulse messages will be used to validate the detection results obtained on temporal criteria. To provide a clearer understanding of the instant at which the subsequent phase of the processing operation according to the invention is located, an explanation shall now be given, with reference to FIG. 8, of the instant at which this subsequent processing takes place in the rest of the process. This figure shows the device 300 and the device 350. Devices 500 and 150 are also shown, in dashes because they are not part of the invention. The device 500 receives the magnitudes LE, LES of the pulse message and, after detection, eliminates all the pulses that have been recognized and confirmed by this device as belonging to S mode responses.

The LEs that have passed this filter are introduced into the device 150 which itself also detects the secondary radar responses. At each detection, the device 150 emits a detection signal BPD. Starting from this signal, it is possible to recover the address of the pulse messages waiting in a circular memory, and hence to start the processing of the responses. The processing is done by a device 380 which receives the signal BPD and the pulse messages.

Figure 9:
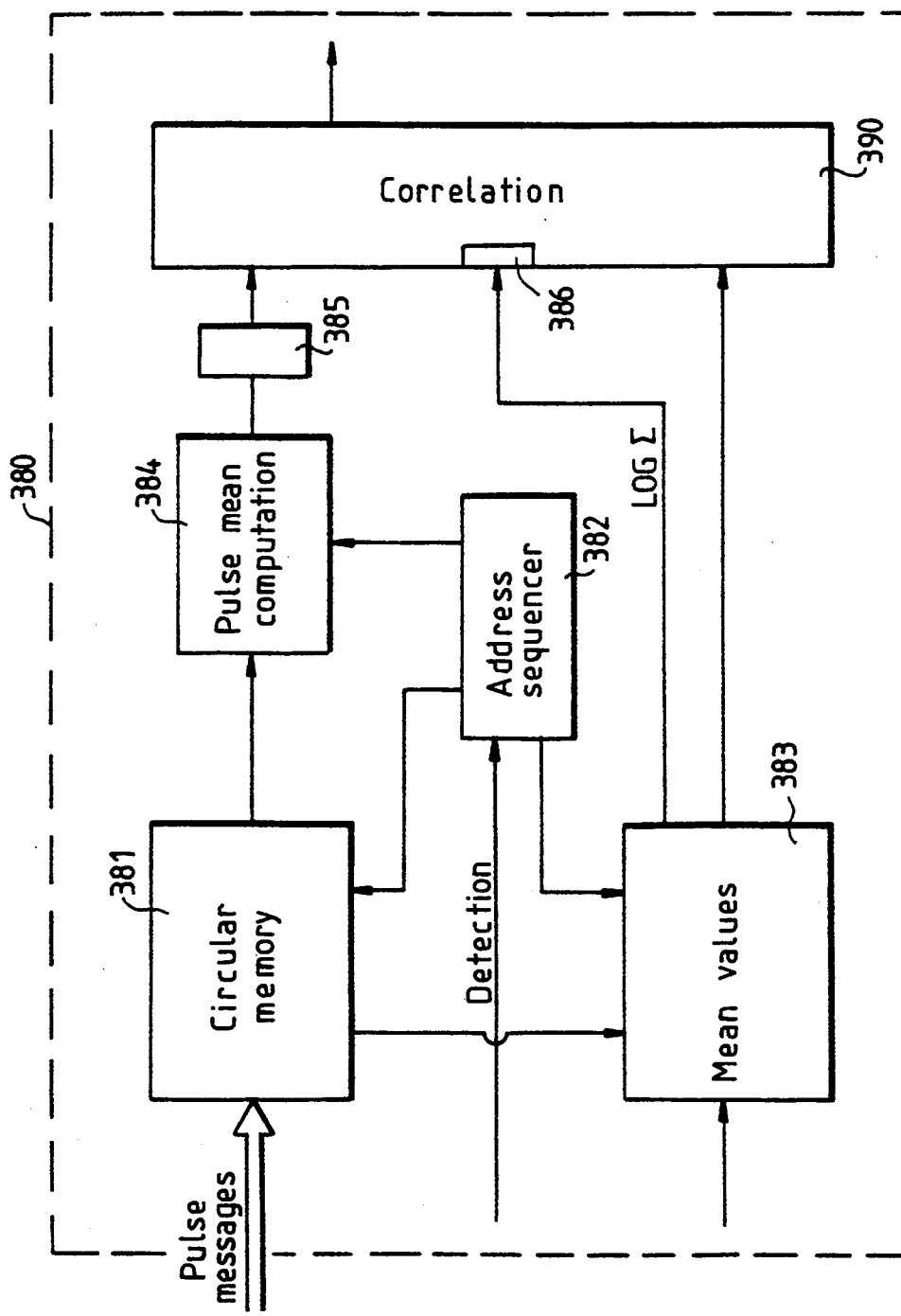
FIG. 9 shows a schematic view of the device for the correlation of the pulses of a detected response.

The device 380 is shown in FIG. 9. It has a circular memory 381 which receives the pulse messages. A module 382 receives the signal BPD and computes the addresses of the pulse messages from this signal.

The address computation is a twofold computation. A first computation selects the addresses of the pulses which, depending on predetermined criteria, will be used for the computation of the mean values on the different magnitudes of the response. This computation is done by a module 383 which receives the messages of the selected pulses, especially the values Sum and NumSam. The mean, for each magnitude, is the result of the division of the sum of the values Sum of the pulses by the sum of the values NumSam of these magnitudes. The sequencer carries out a second computation of an address, and the corresponding pulse messages are set to a module 384 which makes a computation, for each magnitude, of the mean of the value of the sample by dividing the magnitude Sum by the associated magnitude NumSam. The result is introduced into a storage memory 385 designed to keep the values during the computation of the mean value. The magnitudes at output of the modules 385 and 383 are introduced into the device 390 which is a comparator. The pulses are validated only if the difference between each of these values and the corresponding mean value is below a predetermined threshold. The value of the thresholds is adjusted by a module 386 which receives the mean value of Log$\Sigma$ at output of the module 383.

What is claimed is:

1. A method of real-time pre-processing of signals emitted by a radar transponder, the signals of the transponders being constituted by Mode S pulse trains and secondary pulse trains, the pulses having standardized durations and spacings, the method being applicable to a secondary radar extractor located functionally downline with respect to a receiver provided with circuits, said method comprising
   a) producing with said circuits from the signals received, analog magnitudes, namely Log$\Sigma$, a digital magnitude Q$\Sigma$ that can take the value 0 or 1, the passing to 1 of said digital magnitude being the sign of the presence of a pulse leading edge LE, and other magnitudes,
   b) converting said other magnitudes into digital signals by taking samples at a sampling rate,
   c) synchronizing the taking of samples of said analog, digital and other magnitudes by a same clock signal; wherein
   the sampling rate at which the samples are taken is high enough for several pulses to be taken during the shortest standardized pulse duration; and
   d) comparing the value of a following sample representing a magnitude with a value of a preceding sample having the same magnitude, wherein the result of the comparison prompts the passing of a bit to 1, it being possible for no bit, one bit or more bits to remain at the value 0, and each of the bits that can take the value 1 represent a zone of values of a slope corresponding to a speed of variation of the magnitude.

2. The method of claim 1 further comprising,
   e) if the magnitude Q$\Sigma$ remains at the value 1 during a period of time greater than the duration of a normal or S pulse, increased by the value of the duration of the tolerance and the time interval between two successive samples, then generating pseudo pulse leading edges PLE,
   f) examining the way in which the values on a bit created at step d vary and, on one bit, createing a clear zone CLZ signal, which takes the value 1 and keeps this value so long as these values remain simultaneously at stable state values, and a garbling signal PGF (pulse garbling flag) whenever there is a detection of a change of the slope zone of one of the magnitudes; and
   g) transmitting a sample message at subsequent processing stages, wherein said sample message is renewed at each sample and comprises the signals Q$\Sigma$, LE and PLE, PGF, CLZ on one bit and the digital values of the sampled magnitudes on several bits.

3. A method of pre-processing according to claim 2, wherein the different bits representing the slope corresponding to the variation of the signal Log$\Sigma$ are five in number, each of the bits respectively representing:
   a positive steep slope variation;
   a positive gentle slope variation;
   a negative gentle slope variation;
   a negative steep slope variation;
   a stable state,
and wherein there is only one bit representing the $\Delta/\Sigma$ slope which assumes the value 1 if $\Delta/\Sigma$ is stable and the value 0 if $\Delta/\Sigma$ is not stable.

4. A method according to claim 3, further comprising setting the bit representing the stable state of Log$\Sigma$ to 1 and keeping this value as long as the difference in level between a following sample and a previous sample is below a threshold fixed in advance, wherein the threshold has increasing values when Log$\Sigma$ decreases.

5. A method according to claim 2, further comprising generating said pulse pseudo leading edges PLE on two dedicated channels, one channel receiving pseudo edges corresponding to normal pulse lengths PLE and one channel receiving pseudo edges that correspond to S type pulse lengths PLES, wherein said sample message comprises one channel for the PLEs and one channel for the PLES.

6. A method according to claim 5, further comprising generating said pseudo edges at a pulse length before the trailing edge of the signal Q$\Sigma$, if the duration of Q$\Sigma$ is smaller than the duration of two pulses, and behind the leading edge of Q$\Sigma$ at time intervals equal to the duration of a pulse and throughout the duration of Q$\Sigma$, if the duration of the signal Q$\Sigma$ is greater than the duration of two pulses.

7. A method of real-time processing according to claim 2, applicable to an extractor located downline with respect to a receiver provided with a circuit for the analysis of the frequency of the received signals, further comprising creating with said frequency analysis circuit a frequency$\Sigma$ magnitude representing the value of the frequency of the received signal, wherein the clear zone signal CLZ takes the value 1 only if the values of Log$\Sigma$, $\Delta/\Sigma$ and frequency$\Sigma$ are stable.

8. A method according to claim 6, further comprising correcting position of the pulse pseudo leading edges after comparison of the variations of the magnitudes Log$\Sigma$ and $\Delta/\Sigma$.

9. A method according to claim 7, further comprising correcting position of the pulse pseudo leading edges, after comparison of the variations of the magnitudes Log$\Sigma$, $\Delta/\Sigma$ and frequency $\Sigma$.

10. A method according to claim 8, further comprising processing information elements of consecutive samples located in a zone where the value of the clear zone signal continually keeps the value 1 so as to constitute a pulse message.

11. A method according to claim 8 comprising, when the pulses merge, on a bit:
  a magnitude LE which represents a pulse leading edge;
  a magnitude PLE which represents a computed pulse leading edge;
  a magnitude SVF (significant value flag), the value of which indicates that it has not been possible to assign Log$\Sigma$, $\Delta/\Sigma$ samples to this pulse and on several bits;
  a magnitude Log$\Sigma$Sum representing the sum of the values Log$\Sigma$ of the sample messages taken into account to establish the pulse message;
  a magnitude $\Delta/\Sigma$Sum representing the sum of the values $\Delta/\Sigma$ of the sample messages taken into account to establish the pulse message;
  a magnitude NumSam representing the number of samples taken into account to establish each magnitude of the pulse message.

12. A method according to claim 11, wherein the pulse messages, of which one of the values LE or PLE is equal to 1, further comprise, on several bits, a magnitude NextLe representing the time at the end of which a new pulse leading edge is present.

13. A method according to claim 12, applicable to an extractor in which the detection of a response is ensured by the detection of a pair of framing pulses, wherein said pair comprises a first pulse $F_1$ of said train and a second pulse $F_2$ which is separated by a known standardized time from said first pulse, in which each detection signal, BPD or bit pair detection, is associated with a first magnitude on a first garbling assumption bit BD1, which takes the value 1 if another response has been detected after the current response at a time interval from the first pulse $F_1$ that is smaller than the maximum duration of the pulse train constituting a response and a second magnitude on a second garbling assumption bit 2 BD2 which takes the value 1, if another response has been detected before the current response at a time interval smaller than the maximum duration of the pulse train constituting a response, said method further comprising subtracting the value $$\frac{\text{Log } \Sigma \text{ Sum}}{\text{NumSam}}$$

of the pulse $F_1$ from the value $$\frac{\text{Log } \Sigma \text{ Sum}}{\text{NumSam}}$$

of the pulse $F_2$, and emitting a first doubt bit BD7, characterizing the response, which takes the value 1 if the difference is greater than a predetermined threshold.

14. A method according to claim 13, further comprising subtracting the value $$\frac{\Delta/\Sigma \text{ Sum}}{\text{NumSam}}$$

of the pulse $F_1$ from the value $$\frac{\Delta/\Sigma \text{ Sum}}{\text{NumSam}}$$

of the pulse $F_2$, and emitting a second doubt bit BD6, characterizing the response, which takes the value 1 if the difference is greater than a predetermined threshold.

15. A method according to claim 14, applicable to an extractor located downline with respect to a receiver provided with a circuit for the analysis of the frequency of the received signals, further comprising subtracting value $$\frac{\text{Log } \Sigma \text{ Sum}}{\text{NumSam}}$$

of the pulse $F_1$ from the value $$\frac{\text{Log } \Sigma \text{ Sum}}{\text{NumSam}}$$

of the pulse $F_2$, and emitting a third doubt bit BD5, characterizing the response, which takes the value 1 if the difference is greater than a predetermined threshold.

16. A method according to claim 13, further comprising establishing a mean value of Log$\Sigma$
  on $F_1$ and $F_2$, if pulse messages are available on $F_1$ and $F_2$, and if said first doubt bit BD7 has the value 0;
  on $F_1$ only if said first doubt bit BD7 is equal to 1 and said first garbling assumption bit BD1 is equal to 1 or if said first doubt bit BD7 has the value 1 and said first and second garbling assumption bits BD1 and BD2 have the value 0; and
  on $F_2$ only if said first doubt bit BD7 is equal to 1 and said second garbling assumption bit BD2 is equal to 1;
  and deciding that the response is a ghost response, if said first doubt bit BD7 is equal to 1 and said first and second garbling assumption bits BD1 and BD2 are equal to 1.

17. A method according to claim 15, further comprising establishing a mean value of Log$\Sigma$
  on $F_1$ and $F_2$ if pulse messages are available on $F_1$ and $F_2$ and if logic sum of said second and third doubt bits (BD5 and BD6) has the value 0;
  on $F_1$ only if said logic sum (BD5+BD6) is equal to 1 and said first garbling assumption bit BD1 is equal to 1 or if said logic sum (BD5+BD6) has the value 1 and said first and second garbling assumption bits BD1 and BD2 have the value 0; and
  on $F_2$ only if said logic sum (BD5+BD6) is equal to 1 and said second garbling assumption bit BD2 is equal to 1; and deciding that the response is a ghost response if said logic sum (BD5+BD6) is equal to 1 and said first and second garbling assumption bits BD1 and BD2 are equal to 1.

18. A method according to claim 15, further comprising establishing a mean value of Log$\Sigma$
  on $F_1$ and $F_2$, if pulse messages are available on $F_1$ and $F_2$ and if logic sum of said first, second and third doubt bits (BD5+BD6+BD7) has the value 0;

on F1 only if said logic sum (BD5+BD6+BD7) is equal to 1 and said first garbling assumption bit BD1 is equal to 1 or if said logic sum (BD5+BD6+BD7) has the value 1 and said first and second garbling assumption bits BD1 and BD2 have the value 0; and on F2 only if said logic sum (BD5+BD6=BD7) is equal to 1 and said second garbling assumption bit BD2 is equal to 1;

and deciding that the response is a ghost response if said logic sum (BD5+BD6+BD7) is equal to 1 and said first and second garbling assumption bits BD1 and BD2 are equal to 1.

19. A method according to claim 16 further comprising, if said first garbling assumption bit BD1 has the value 1, assigning a fourth doubt bit BD3 or BD4 to each of the last pulses considered, by virtue of their position, to form part of the response, said fourth doubt bit BD3 or BD4 taking the value 1 if this pulse is in the time interval where the following response may be present; if said second garbling assumption bit BD2 has the value 1, assigning a third doubt bit BD5 to each of the first pulses considered, by virtue of their position, to form part of the response, said third doubt bit BD5 taking the value 1 if this pulse is in the time interval where the previous response can be present; comparing the value of at least one of the magnitudes Log$\Sigma$, $\Delta/\Sigma$, frequency$\Sigma$ of each pulse which, by virtue of its position, belongs to the response detected, with the corresponding mean value of the response; emitting a reliance bit, BC7 for Log$\Sigma$, BC6 for $\Delta/\Sigma$ and BC5 for frequency$\Sigma$, said reliance bit taking the value 1 if the difference between the value of the pulse and the mean value is greater than a predetermined threshold; and eliminating the pulse of the response if one of the fourth doubt bits BD4 or BD3 has the value 1 and if logic sum said reliance bits (BC4+BC5+BC6) has the value 1.

20. A device for the real-time processing of a radar transponder response signal, the signal of the transponder being constituted by Mode S pulse trains and secondary pulse trains, the pulses having standardized durations and spacings, the device being located functionally downline with respect to a plurality of circuits which, from the signals received, produce analog magnitudes Log$\Sigma$, $\Delta/\Sigma$ and other signals and a digital signal Q$\Sigma$ that can take the value 0 or 1, the passing to 1 of this signal being the sign of the presence of a pulse leading edge LE, wherein said device comprises a first processing line, comprising a converter which receives the analog signal Log$\Sigma$ from said plurality of circuits and converts said analog signal Log$\Sigma$ into a digital signal at a sampling frequency;

a first circuit which receives the converted signal Log$\Sigma$ from said converter; compares a value of a preceding sample with a value of a current sample; and produces a slope Log$\Sigma$ signal on a bit on a dedicated channel of a bus having a plurality of channels, wherein selection of a channel depends on result of the comparison;

a first circular memory which receives, at said sampling frequency rate, from said first circuit, a message comprising a plurality of bits, wherein only one of said plurality of bits has a value 1;

a second processing line comprising a module which receives samples of said digital signal Q$\Sigma$ from said plurality of circuits and creates a signal PLE, if said signal Q$\Sigma$ remains at value 1 during a period of time at least equal to maximum duration of a pulse increased by jitter due to the sampling, and a second circuit which receives samples of said signal Q$\Sigma$ from said plurality of circuits and creates a signal XLE, if said signal Q$\Sigma$ keeps the value 1 for a period of time greater than the duration of two pulses, wherein said first and second processing lines comprise a shape analysis circuit; and a third processing line comprising a second circular memory which receives the signals Log$\Sigma$ and $\Delta/\Sigma$ from said plurality of circuits, wherein said shape analysis circuit and said second circular memory deliver a sampling message at said sampling frequency.

21. A device according to claim 20, further comprising a module which receives the signal Q$\Sigma$ and creates a signal PLES, if said signal Q$\Sigma$ remains at value 1 for a period of time greater than the duration of an S pulse, and a module which receives said signal Q$\Sigma$ and creates a signal XLES, if said signal Q$\Sigma$ remains at the value 1 for a period of time at least equal to the duration of two S pulses, wherein said signals PLES and XLEs are transmitted to said shape analysis circuit.

22. A device according to claim 20, further comprising a device for analysis of the slope of $\Delta/\Sigma$, wherein said slope analysis device receives the samples of $\Delta/\Sigma$ from said plurality of circuits; compares a value of a following sample with that of a preceding sample; and produces a signal expressing the result of the comparison and said resulting signal is transmitted to said shape analysis circuit via said second circular memory.

23. A device according to claim 21, further comprising an analog-digital converter upline from said processing lines which receives a frequency$\Sigma$ signal, representing the frequency of the received signal and a module that compares a value of a preceding sample with the value of a following sample, wherein an output signal from the comparison is supplied to said shape analysis circuit via the second circular memory and said analog-digital converter supplies said second circular memory.

24. A device according to claim 20, further comprising:

a summator module which receives the converted signal Log$\Sigma$ from said converter, having zero settings controlled by a control module that receives signals LE, wherein said summator module produces a signal Log$\Sigma$Sum representing a sum of several Log$\Sigma$ samples and the control module produces a signal NumSam representing the number of samples added up by said summator module, the devices supplying a circular memory and a module which receives said signals LE and creates a signal (nextLE) representing the number of sampling periods between two consecutive signals LE, and wherein outputs of said summator module and said circular memory produce a pulse message which is renewed at the sampling frequency.

25. A device according to claim 22, further comprising:

a summator module receiving the sampled signals Log$\Sigma$, $\Delta/\Sigma$ from said converter and said slope analysis device, having zero settings controlled by a control module that receives signals LE, wherein said summator module produces a signal Log$\Sigma$Sum representing a sum of several Log$\Sigma$ samples and the control module produces a signal NumSam representing the number of samples added up by said summator module for each of the signals Log$\Sigma$ and $\Delta/\Sigma$ the devices supplying a circular memory, and a module which receives the signals LE and creats a signal (nextLE) representing the number of sampling periods between two consecutive signals LE, and wherein outputs of said summator module and of said circular memory produce a pulse message renewed at the sampling frequency.

26. A device according to claim 23, further comprising:
a summator module which receives the sampled signals Log$\Sigma$, $\Delta/\Sigma$, and the signal frequency$\Sigma$, having zero settings controlled by a control module that receives the signals LE, wherein said summator module produces a signal Log$\Sigma$Sum representing a sum of several Log$\Sigma$ samples and the control module produces a signal NumSam representing the number of samples added up by said summator module for each of the signals Log$\Sigma$ and $\Delta/\Sigma$ and frequency$\Sigma$, the devices supplying a circular memory, and a module which receives the signals LE and creats a signal (nextLE) representing the number of sampling periods between two consecutive signals LE, and wherein outputs of the summator module and the circular memory produce a pulse message renewed at the sampling frequency.

27. A device according to claim 20, further comprising a module which receives the pulse messages and a response detection signal and filters the pulse messages of each detected response.

28. A device according to claim 27, wherein the module which receives and filters pulse messages comprises
an addressable circular memory which receives the pulse messages in sequence, a sequencer which receives detection messages, a mean value device which computes the mean value, receives addresses of information elements on the pulses in said addressable circular memory determined by the sequencer, and computes, on the basis of said information elements, mean reference values for magnitudes characterizing a pulse,
a module which receives said mean reference values from said receiving and filtering module, and
a second module which receives the information elements from said addresses, for each of the pulses of the response, compares, for each magnitude, the mean reference value and a value from said second module, and eliminates the pulse message if the difference between said value from the second module and the mean reference value is greater than a predetermined threshold.

29. A device according to claim 28, wherein the receiving and filtering module further comprises a threshold-adjusting module controlled by a value coming from said module.

* * * * *